Figure 1:
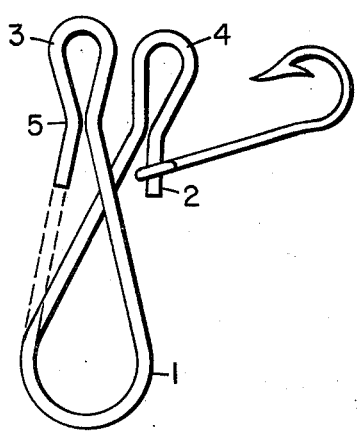

United States Patent [19]

James

[11] 3,913,185

[45] Oct. 21, 1975

[54] EASY-ON FISH HOOK CLIP

[76] Inventor: Newell E. James, 133 Urban Road, Monticello, Wis. 53570

[22] Filed: Oct. 18, 1973

[21] Appl. No.: 398,758

[52] U.S. Cl. .................................. 24/237; 43/42.49
[51] Int. Cl.² .................. A44B 13/02; A01K 85/00
[58] Field of Search ............ 43/42.38, 42.49, 43.1, 43/43.2, 44.83; 24/237

[56] References Cited
UNITED STATES PATENTS

| | | | |
|---|---|---|---|
| 1,191,009 | 7/1916 | Laramie | 24/237 |
| 2,564,260 | 8/1951 | Houser | 24/237 |
| 2,840,898 | 7/1958 | Yeo | 24/237 X |
| 2,871,540 | 2/1959 | Smith | 43/44.83 X |
| 3,138,840 | 6/1964 | Rich | 43/42.49 |
| 3,277,549 | 10/1966 | Bradshaw | 24/237 |

*Primary Examiner*—Donald A. Griffin

[57] ABSTRACT

An easy-on fish hook and lure clip of the weedless type comprising a continuous length of spring steel wire bent in to touch in such a manner as to present the appearance of a figure eight having a small upper narrow loop adapted to receive a fishing line and facilitate tying of said line thereto and a larger wider lower loop adapted to receive a fish lure in such a manner so as to allow the lure to work freely from side to side to attract a fish, the free ends of the clip being of generally V-shape and each forming an upper narrow loop which upper loops are superimposed so as to lie in generally the plane of the large wider lower loop, the upper loops being adapted to be sprung apart to receive an eye of a lure over one said free end so that it can be slid down the wire past the normally touching portions of the wire so as to be retained in the wider lower loop, the fishing line being adapted to be attached to the upper narrow loop by pushing a portion of the line through the top end of the clip between the planes formed by the free ends of the clip, wrapping the line several times around the upper narrow loop and then pushing the loops of line so formed off the upper loop of wire up over the top of the clip and pulling the line tight to form a no slip knot.

1 Claim, 7 Drawing Figures

U.S. Patent  Oct. 21, 1975  3,913,185

EASY-ON FISH HOOK CLIP

This invention is a simplified and improved fish hook, and lure clip, that answers, and fills the real need of fishermen, especially women and children who can not use snaps, and devices now in use, or tie complicated knots required for monofilament fish line, because of slipperiness of line. It will greatly aid men too, because of difficulty in tying knots with cold, wet and slippery hands. When fish are biting any delay is aggravating and can mean the loss of several fish.

This clip having a wide loop at bottom 1., allows lure to work freely from side to side as designed to do by the maker. Making unnecessary the tying of the knot that now serves that purpose, and is very difficult to tie.

Clip provides a quick, safe, and sure method of affixing line to hook or lure. Line can be removed, and hook, or lure changed, and line replaced in seconds. Safe, because it can not break thumb or finger nails, or injure and make hands sore. Sure, because it is weedless, and cannot be sprung open, or broken, to lose lure, and or both fish and lure.

FIG. 1., is a flat view of Clip pressed, or squeezed open to show formation, and manner in which hook, or lure is placed on end of Clip 2., pushed up, around and down to large bottom loop 1. It also shows two small elongated upper narrow loops 3., and 4., and all wires touching in midsections, 5.

Figure 2:
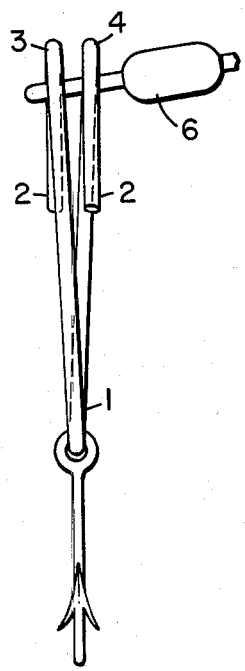
Figure 3:
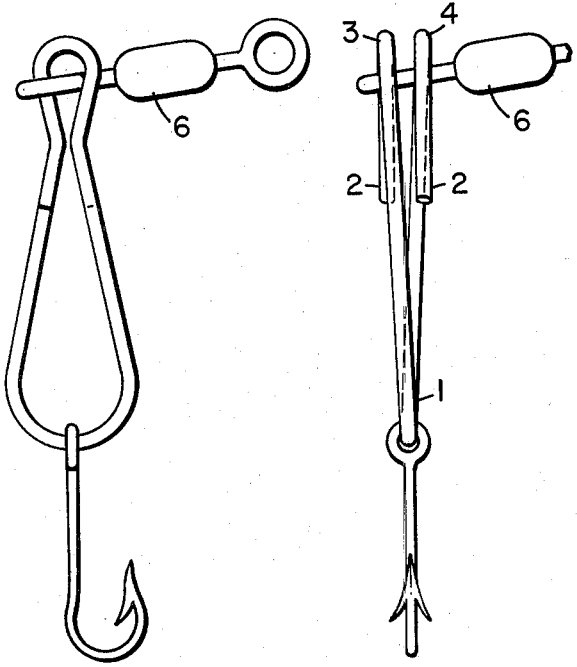

FIG. 2., is a view of FIG. 1., showing fish hook in position on large loop 1., and swivel 6., being affixed to Clip, by placing on one small elongated top loop 3., or 4. Swivel is then pulled down over end of wire 2., then pulled back to top engaging both small loops 3., and 4.

Figure 4:
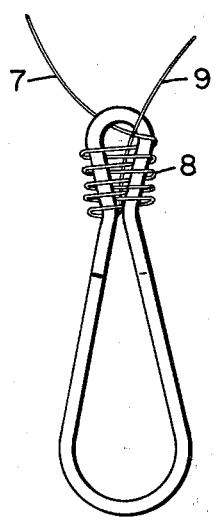

FIG. 4., is a flat view of Clip showing how mono line is applied to Clip to form a double clinch knot. Line 7., is put through both small top loops 3., and 4., wound, or wrapped around five times 8., then end of line 9., put through on opposite side of 7., in loops 3., and 4., and above loops 8., in fish line.

Figure 5:
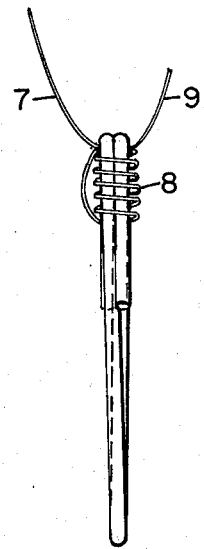

FIG. 5., is a side view of FIG. 4., showing fish line on Clip loosely. Loops in line 8., are then pushed up and off of Clip loops 3., and 4., fish line 7., and 9., are then drawn, or pulled tight while holding loops 8., in place. End of line 9., is then cut off.

Figure 6:
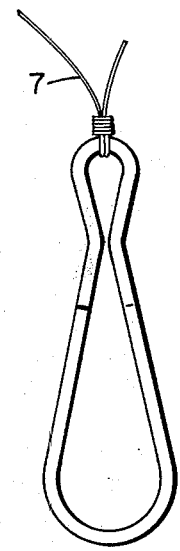

FIG. 6., shows Clip with double clinch knot securely tied.

Figure 7:
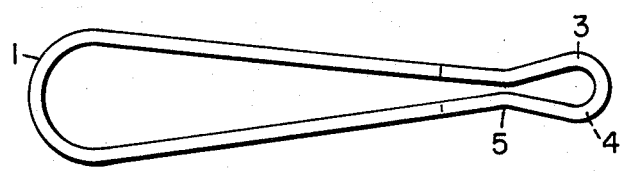

FIG. 7., shows a long Clip, making a wire leader completely unnecessary for fish that cut line with sharp teeth.

Clip thoroughly tested and proven in actual fishing.

I claim:

1. An easy-on fish hook and lure clip of the weedless type comprising a continuous length of spring steel wire bent in to touch in such a manner as to present the appearance of a figure eight having a small upper narrow loop adapted to receive a fishing line and facilitate tying of said line thereto and a large wider lower loop adapted to receive a fish lure in such a manner so as to allow the lure to work freely from side to side to attract a fish, the free ends of the clip being of generally V-shape and each forming an upper narrow loop which upper loops are superimposed so as to lie in generally the plane of the large wider lower loop, the upper loops being adapted to be sprung apart to receive an eye of a lure over one said free end so that it can be slid down the wire past the normally touching portions of the wire so as to be retained in the wider lower loop, the fishing line being adapted to be attached to the upper narrow loop by pushing a portion of the line through the top end of the clip between the planes formed by the free ends of the clip, wrapping the line several times around the upper narrow loop and then pushing the loops of line so formed off the upper loop of wire up over the top of the clip and pulling the line tight to form a no slip knot.

* * * * *